United States Patent [19]

Joswig

[11] Patent Number: 5,628,147
[45] Date of Patent: May 13, 1997

[54] DEVICE FOR KEEPING A FLOWER POT OR THE LIKE RAISED FROM THE BOTTOM OF A FLOWER POT CONCEALER OR THE LIKE

[76] Inventor: Siegfried Joswig, Kirkerudbakken 10, 1800 Askim, Norway

[21] Appl. No.: 411,615

[22] PCT Filed: Aug. 11, 1994

[86] PCT No.: PCT/NO94/00133

§ 371 Date: Apr. 18, 1995

§ 102(e) Date: Apr. 18, 1995

[87] PCT Pub. No.: WO95/05069

PCT Pub. Date: Feb. 23, 1995

[30] Foreign Application Priority Data

Aug. 18, 1993 [NO] Norway .................... 932932

[51] Int. Cl.$^6$ .................... A01G 31/02
[52] U.S. Cl. .................... 47/79; 47/81
[58] Field of Search .................... 206/45.19, 588, 206/591, 303, 418; 47/79 N, 81 N, 81 S, 81 D, 79 R, 79 D, 71

[56] References Cited

U.S. PATENT DOCUMENTS

| | | | |
|---|---|---|---|
| 2,058,934 | 10/1936 | Yohe | 47/79 D |
| 2,148,048 | 2/1939 | Gray | 206/45.19 |
| 3,093,240 | 6/1963 | Donahue | 206/45.19 |
| 3,298,133 | 1/1967 | Courtright | 47/81 D |
| 3,425,367 | 2/1969 | Oravez | 108/51.3 |
| 3,899,072 | 8/1975 | Caddy | 206/45.19 |
| 4,965,963 | 10/1990 | Lyon | 47/81 S |

FOREIGN PATENT DOCUMENTS 2419703  11/1975  Germany .................... 47/81 S

Primary Examiner—Henry E. Raduazo
Attorney, Agent, or Firm—Bacon & Thomas

[57] ABSTRACT

A device for keeping a flower pot or the like raised from the bottom of a water retaining flower pot concealer or the like, whereby moisture may be supplied to the roots and soil in the flower pot by a wick extending from a water supply in the bottom of the pot concealer below the bottom level of the flower pot. The device is defined by a unitary piece, which in the outset is planar, comprising a central portion which is to support the flower pot and a number of circumferentially separated rim portions adapted to keep the central portion lifted above the bottom of the concealer. Between the lifting rim portions, which are hingedly connected to the central portion, further circumferentially separated rim portions are provided, which are also hingedly connected to the central portion for the purpose of stiffening the same. The further rim portions can be hingedly connected to or detachably connected to the lifting rim portions.

7 Claims, 4 Drawing Sheets

DEVICE FOR KEEPING A FLOWER POT OR THE LIKE RAISED FROM THE BOTTOM OF A FLOWER POT CONCEALER OR THE LIKE

BACKGROUND OF THE INVENTION

1. Field of the invention

The present invention relates to a device for keeping a flower pot or the like raised from the bottom of a water retaining flower pot concealer or the like. When using such a device it is possible, by means of a wick extending from a water supply in the bottom of a flower pot concealer into the roots and soil in the flower pot, to provide a long-time watering of the plants in the pot, e.g. during holiday absence, without at the same time causing an over-watering since the lower part of the pot is not submerged in water. Such flower pot concealers may be in the form of a larger pot (possibly with exterior decorations) in which the flower pot may be placed, or it may be in the form of a window box or a similar arrangement for "planting" flower pots in-doors or on balconies or terraces.

2. Background

Several proposals have been made for such devices, inter alia in EP 016352 and 025521, in FR 1152961 and in U.S. Pat. No. 2,072,172. These and other previously known devices for this purpose are however encumbered with the disadvantage that the flower pot and/or the concealer must be specially adapted to the device.

SUMMARY OF THE INVENTION

The present invention provides a device of the character and for the purpose as defined above, whereby special adaption of the flower pot or the flower pot concealer is no longer required. The device of the invention is simple in use and inexpensive and may be supplied in several sizes to allow use of the system in connection with flower pots and flower pot concealers of different sizes.

Thus, the present invention relates to a device for keeping a flower pot or the like raised from the bottom of a water retaining flower pot concealer or the like, whereby moisture may be supplied to the roots and soil in the flower pot by means of a wick extending from a water supply in the bottom of the flower pot concealer below the bottom level of the flower pot. The device consists of a unitary piece, which in the outset is planar, comprising a central portion which is to support a flower pot and a number of circumferentially separated rim portions adapted to keep the central portion lifted above the bottom of the concealer, and it is characterized in that there are provided, between the lifting rim portions, which are hingedly connected to the central portion, further circumferentially separated rim portions, which are also hingedly connected to the central portion for the purpose of stiffening the same, the further rim portions being hingedly connected to or detachably connectable to the lifting rim portions.

Further features of the invention will appear from the accompanying claims. Features and advantages of the invention will also be apparent from the following description making reference to the drawings.

DETAILED DESCRIPTION OF THE INVENTION

Figure 1:
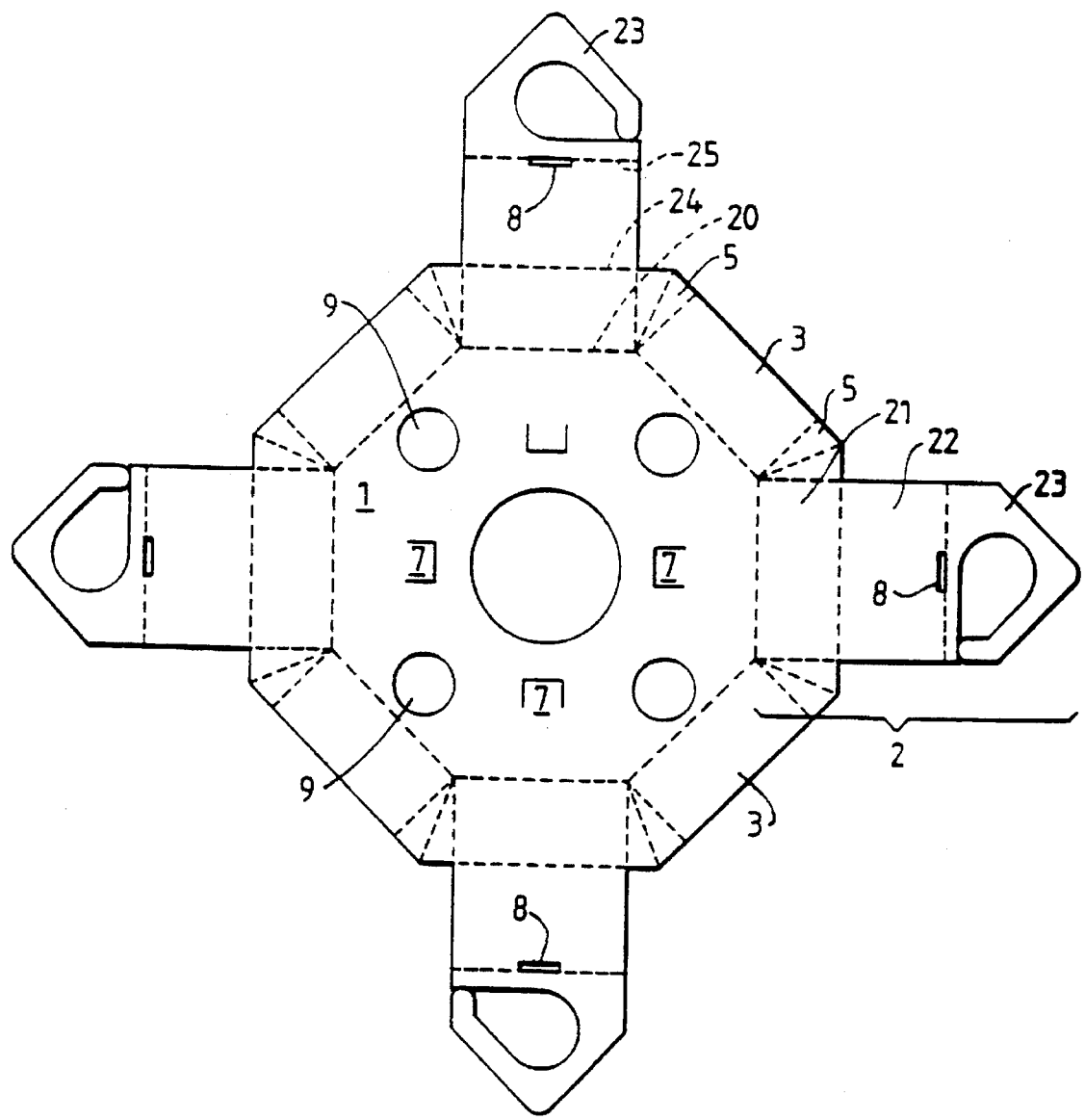
FIG. 1 shows a plan view of one embodiment of a device according to the invention.
Figure 2:
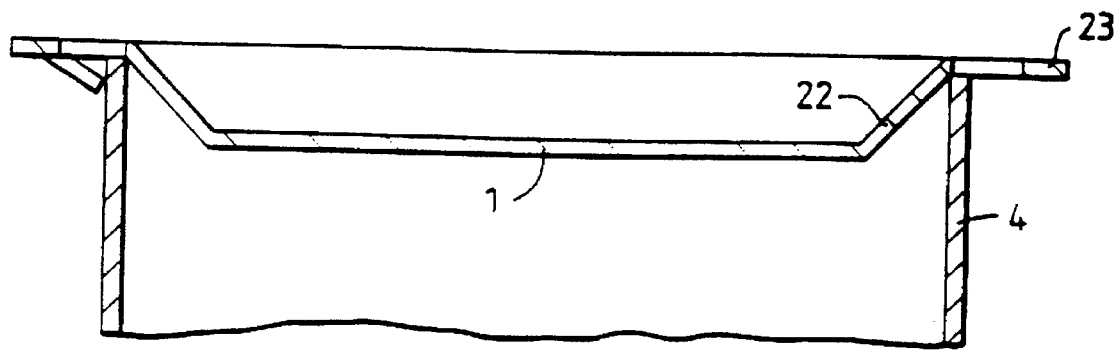
FIGS. 2 and 3 show, schematically and partly in section, two states of use of the device according to FIG. 1.

FIG. 1 discloses an embodiment of a device according to the invention for keeping a flower pot or the like raised from the bottom of a flower pot concealer, the device comprising a unitary piece of plastic material which from the outset is planar, e.g. a 1 mm thick plate of polypropylene or polyethylene. The unitary piece comprises a central portion 1 and circumferentially separated rim portions 2 and 3 which are hingedly connected to the central portion 1. One set of rim portions 2 consists of mutually hinged-together sections 21, 22 and 23 which, by folding about the respective hinges 20, 24 and 25 form supporting feet which may be placed on the bottom of the flower pot concealer 4, such as appears from FIG. 3 and in greater detail from FIGS. 4 and 5.

Figure 3:
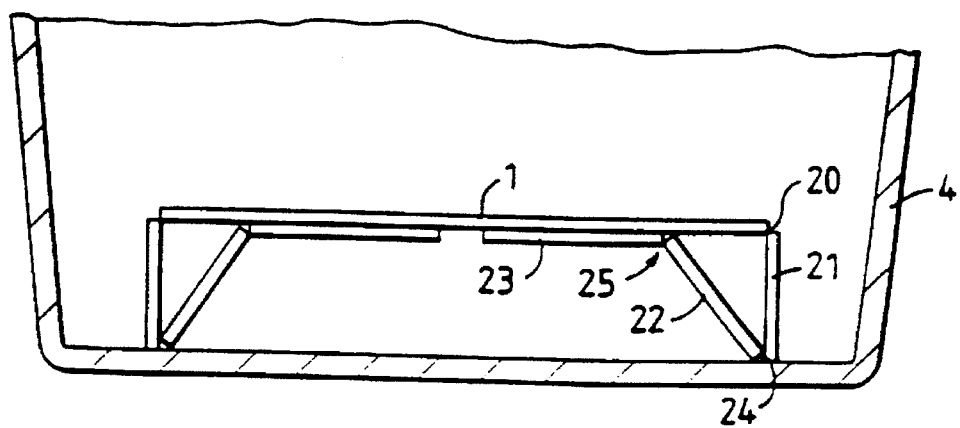
Figure 4:
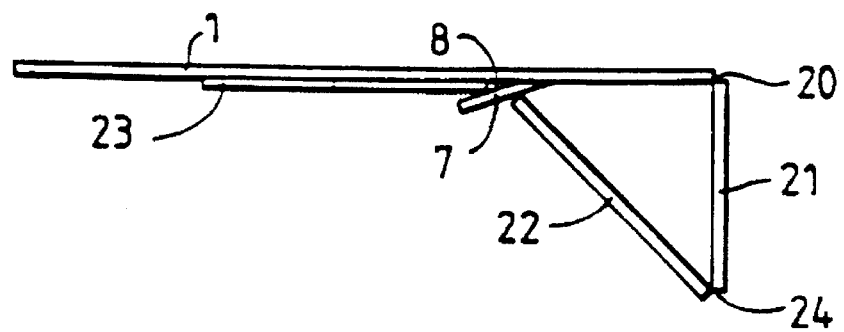
FIGS. 4 and 5 show details, partly in section, as seen in side view and from below, respectively, of the device of FIG. 1 in the use state shown in FIG. 3.
Figure 5:
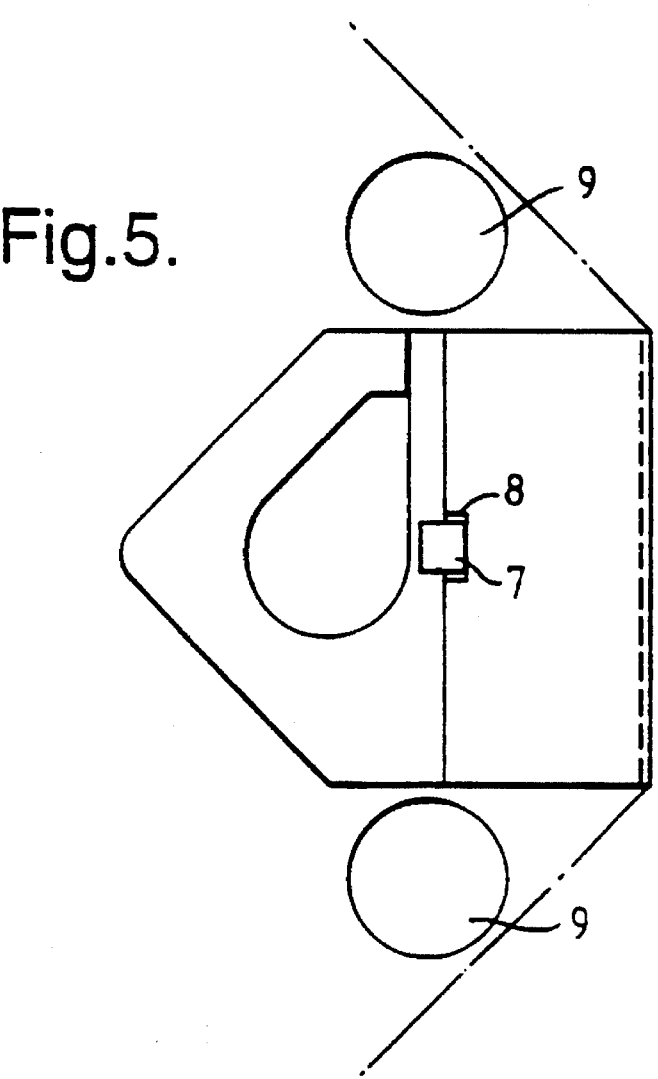

In order to lock the rim portions 2 in a folded state, cf. FIGS. 3 and 4, the central portion 1 is provided with flaps or the like 7 adapted to co-act with corresponding recesses or cutouts 8 in the rim portions 2. Differently shaped co-acting elements are indeed feasible, i.e. studs or pins to co-act latchlike with holes or bores.

In order to hook the device of the invention onto the rim of the pot concealer 4, the outer sections 23 of the rim portions 2 are hook-shaped. Similar hook-like configurations may be provided on the further rim portions 3, as an alternative to or in addition to the hook-like sections 23 on the first set of rim portions 2. The hook-like sections 23 of the rim portions 2 and/or the corresponding hook-like sections on the further rim portions 3 may, if desired, be provided with a hook-like configuration different from that shown in FIGS. 1 and 5.

Alternatively, separate hook elements may be utilised which are releasably attached to the corresponding rim portions 2 and/or 3 by means of co-acting pin-and-hole or other convenient arrangement.

As it appears from FIG. 1, the rim portions 2 and 3 are mutually hingedly interconnected by means of double hinges 5, but the rim portions 2 and 3 may alternatively be adapted to be detachably interconnected by interacting pin-and-hole or corresponding arrangements whereby the rim portions 3 are retained in an angular position relative to the central portion 1 when the rim portions 2 are folded relative to the central portion 1. The central portion 1 is thereby stiffened in order better to carry the flower pot.

Figure 6:
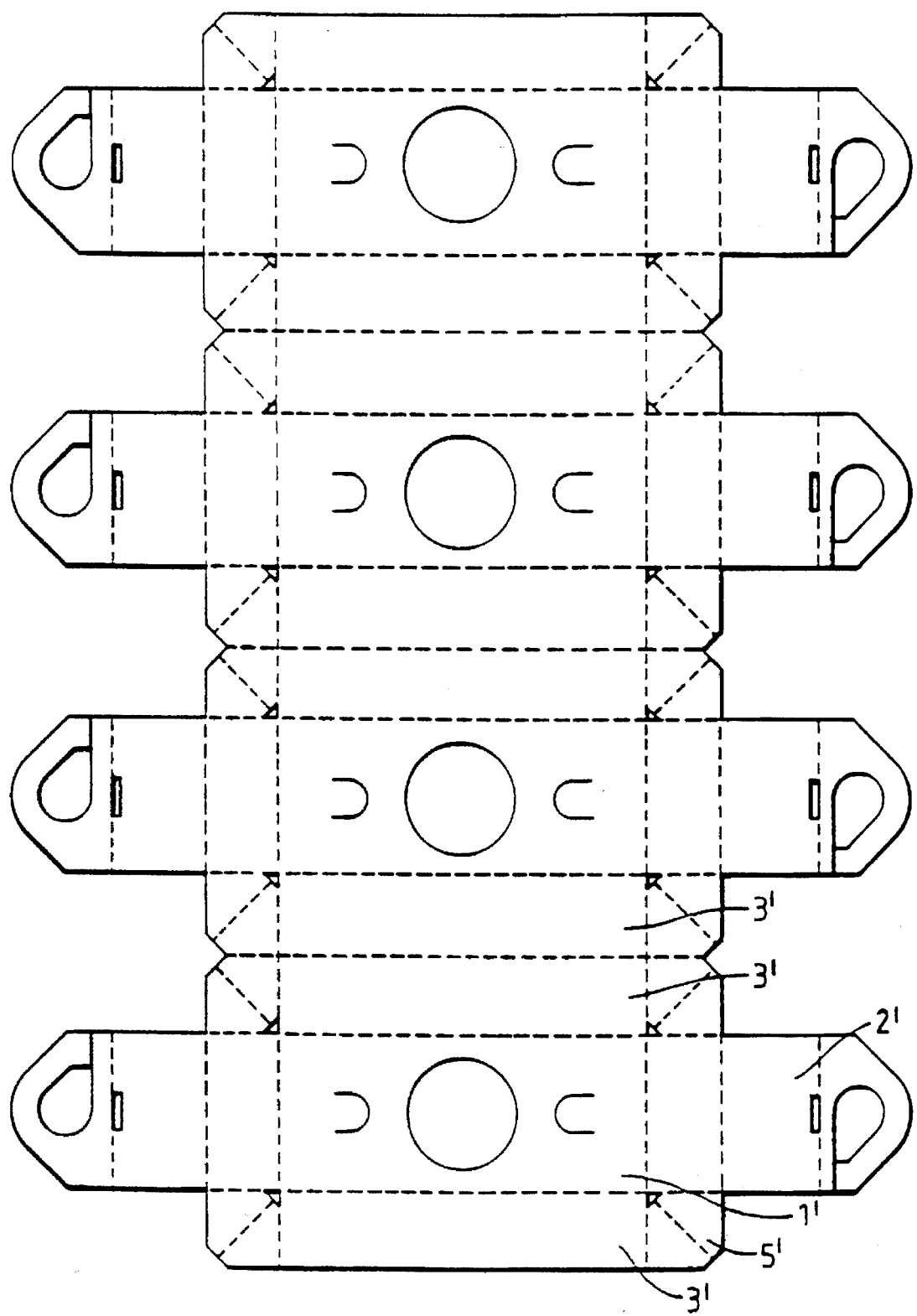
FIG. 6 shows a plan view of a different embodiment of the invention.

FIG. 6 shows an alternative embodiment, particularly suitable for use in connection with window boxes or similar arrangement for "planting" flower pots in-doors or on balconies or terraces. In this embodiment, several units are interconnected in a row, each unit consisting of a central portion 1' having rim portions 2' and 3' being hingedly connected to the adjacent central portion 1'. The rim portions 2' are, similarly to the rim portions 2 in FIG. 1, composed of a number of mutually hinged-together sections of which the outer is shaped as a hook. The rim portions 2' and 3' of each unit are mutually interconnected by double-hinges 5' or detachable interconnection means as described above as alternative to the double-hinges.

One rim portion 3' of one unit 1' is hingedly connected to a similar rim portion of an adjacent unit so that the units provide a series of central portions 1' provided with hooks along two edges of the series. The hinge connection between the respective units serve conveniently as "tearing guides" for reduction of the length of the row by removal of one or more units.

The rim portions 2' may, similarly to the rim portions 2 of FIG. 1, be hooked onto the rim of a pot concealer in the form of a window box or the like. These rim portions 2' may alternatively, similarly to the rim portions 2 of FIG. 3 and 4, be folded to provide supporting feet.

The central portion 1 (FIG. 1) is provided with apertures 9 through which a wick may be passed from a water reservoir in the bottom of the pot concealer 4 and through the bottom of the pot.

By using a device according to this invention a flower pot may be supplied with water and possibly fertilizer even during longer periods of absence of someone attending to the flowers. Even with the device in its lifted position, hooked onto the rim of the concealer, the wick will not be exposed to direct sunshine and will consequently not be liable to a rapid drying-out.

I claim:

1. A plant watering system comprising a water retaining flower pot concealer having a bottom and upwardly extending sidewalls, in combination with a device for keeping a flower pot or the like raised from a bottom of said concealer, said device comprising:

a central portion adapted to support a flower pot or the like thereon;

a plurality of first rim portions hingedly connected, at circumferentially spaced locations, to said central portion;

a plurality of second rim portions hingedly connected, at circumferentially spaced locations, to said central portion, said plurality of first rim portions and said plurality of second rim portions constituting a unitary piece; and means for interconnecting said plurality of second rim portions to respective ones of said plurality of first rim portions, wherein said device is adapted to be placed in a water retaining concealer with said central portion being stiffened by said plurality of second rim portions and supported above a bottom of the concealer by said plurality of first rim portions such that a flower pot placed on said central portion can be spaced above water placed in the concealer but moisture can be supplied to the flower pot through a wick extending from the water to the flower pot.

2. The device according to claim 1, wherein each of said plurality of first rim portions comprises a plurality of sections which are joined through respective hinged connections whereby said plurality of first rim portions can be folded at said hinged connections to form a supporting feet for said device.

3. The device according to claim 1, further comprising means for releasably interconnecting said plurality of first rim portions to said central portion.

4. The device according to claim 1, having connected thereto a plurality of units each comprising a respective central portion adapted to support a flower pot or the like thereon and respective first and second rim portions, said plurality of units being interconnected by having adjacent ones of said second rim portions interconnected.

5. The device according to claim 1, wherein said interconnecting means comprises a respective detachable connections between said plurality of first rim portions and said plurality of second rim portions.

6. A device for keeping a flower pot or the like raised from a bottom of a water retaining concealer comprising:

a central portion adapted to support a flower pot or the like thereon;

a plurality of first rim portions hingedly connected, at circumferentially spaced locations, to said central portion;

a plurality of second rim portions hingedly connected, at circumferentially spaced locations, to said central portion, said plurality of first rim portions and said plurality of second rim portions constituting a unitary piece; and means for interconnecting said plurality of second rim portions to respective ones of said plurality of first rim portions, wherein said device is adapted to be placed in a water retaining concealer with said central portion being stiffened by said plurality of second rim portions and supported above a bottom of the concealer by said plurality of first rim portions such that a flower pot placed on said central portion can be spaced above water placed in the concealer but moisture can be supplied to the flower pot through a wick extending from the water to the flower pot, wherein each of said first rim portions includes an end section, remote from said central portion, that is hook shaped.

7. The device according to claim 6, further comprising a plurality of units, each comprising a respective central portion and respective first and second rim portions, said plurality of units being interconnected by having adjacent ones of said second rim portions interconnected.

* * * * *